(No Model.)

J. ROSS.
DEVICE FOR HANDLING DRAIN TILES.

No. 287,727. Patented Oct. 30, 1883.

Attest:
T. Walter Fowler
E. M. Johnson

Inventor;
James Ross atty.

UNITED STATES PATENT OFFICE.

JAMES ROSS, OF EL PASO, ILLINOIS.

DEVICE FOR HANDLING DRAIN-TILES.

SPECIFICATION forming part of Letters Patent No. 287,727, dated October 30, 1883.

Application filed July 27, 1883. (No model.)

*To all whom it may concern:*

Be it known that I, JAMES ROSS, a citizen of the United States of America, residing at El Paso, in the county of Woodford and State of Illinois, have invented certain new and useful Improvements in Devices for Handling Drain-Tiles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in a device for handling drain-tiles, earthen pipes, or other hollow cylinders; and it consists of an implement which is provided with a handle, to which are attached two downwardly-projecting bifurcated bars having outwardly-extending tines, said handle being on the same plane as the tines and projecting over the same, as will be hereinafter more fully set forth, and pointed out in the claim.

Figure 1:
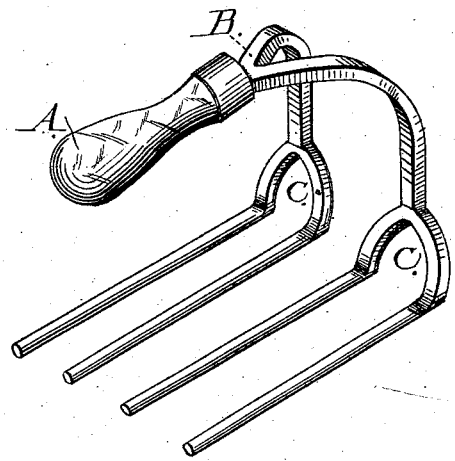
Figure 2:
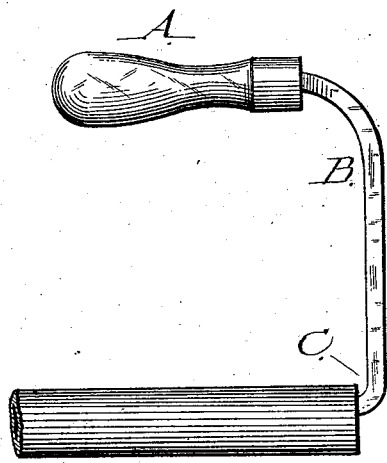

In the accompanying drawings, which illustrate my invention, Figure 1 is a perspective view. Fig. 2 is a side view, showing the implement loaded.

A represents the handle of the implement, which may be constructed of wood in the ordinary manner, and is provided with an end ferrule.

B represents the connecting-bars, which are united to each other at their upper ends, at which point they are bent slightly forward and secured to the handle A. At a suitable point the lower ends of these bars are bifurcated and bent outwardly, as shown at C, from whence they project downwardly, and are bent at right angles with the connecting-bars B, so as to be parallel with the handle A.

By means of an implement constructed as hereinbefore described I am enabled to carry four pieces of drain tile or tubing without inconvenience, and when said tiles are placed upon the tines B and the handle A is grasped, the weight of the tiles will have a tendency to throw said handles slightly upward when the same is grasped properly, thus inclining the point of the tine B upwardly, so as to prevent the tiles slipping off the same. By means of this implement the tiles may be readily placed upon the tines and the same transported from place to place.

Having thus described my invention, what I claim as new, and desire to secure by Letters Patent, is—

An implement for carrying tile, as described, consisting of the bifurcated bars B, with tines projecting therefrom, and provided with a handle which projects over the tines, substantially as shown.

In testimony whereof I affix my signature in presence of two witnesses.

JAMES ROSS.

Witnesses:
A. M. CAVAN,
E. W. JOHNSON.